United States Patent
Nakagawa

(10) Patent No.: US 9,538,064 B2
(45) Date of Patent: Jan. 3, 2017

(54) IMAGE PICKUP APPARATUS, LENS APPARATUS, AND CAMERA APPARATUS

(71) Applicant: CANON KABUSHIKI KAISHA, Tokyo (JP)

(72) Inventor: Hidenori Nakagawa, Utsunomiya (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 96 days.

(21) Appl. No.: 13/760,215

(22) Filed: Feb. 6, 2013

(65) Prior Publication Data

US 2013/0201381 A1  Aug. 8, 2013

(30) Foreign Application Priority Data

Feb. 8, 2012 (JP) ................................. 2012-025040

(51) Int. Cl.
*H04N 5/262* (2006.01)
*G03B 13/00* (2006.01)
*H04N 5/232* (2006.01)

(52) U.S. Cl.
CPC ................................. *H04N 5/23212* (2013.01)

(58) Field of Classification Search
CPC ............ H04N 5/23212; H04N 5/23287; H04N 5/23293; H04N 5/23296; H04N 5/2254; H04N 5/232; H04N 5/23264; H04N 5/225; H04N 5/23251; H04N 5/23254; H04N 5/335; H04N 5/374; H04N 9/045; A61B 17/00234; G02B 27/646; G02B 21/361; G02B 7/09; G03B 13/36
USPC ..................... 348/208.4–208.6, 231.2, 231.6, 231.3,348/240.99, 240.3, 345, 352
See application file for complete search history.

(56) References Cited

U.S. PATENT DOCUMENTS

| | | | |
|---|---|---|---|
| 7,430,010 B2 * | 9/2008 | Sasakura | 348/345 |
| 7,463,426 B2 * | 12/2008 | Nishio | 359/683 |
| 8,212,895 B2 | 7/2012 | Nakamura | |
| 8,730,381 B2 * | 5/2014 | Uchiyama | 348/360 |
| 8,754,975 B2 * | 6/2014 | Hjelmstrom et al. | 348/335 |

(Continued)

FOREIGN PATENT DOCUMENTS

| | | |
|---|---|---|
| JP | 11183782 A | 7/1999 |
| JP | 2000066083 A | 3/2000 |

(Continued)

OTHER PUBLICATIONS

Kumagai, Fumihiro, Machine Translation of JP 2008129455 A (Imaging Device, Control Method, and Program), Jun. 5, 2008.*
office Action issued in JP2012-025040, mailed Dec. 17, 2015.

*Primary Examiner* — Roberto Velez
*Assistant Examiner* — Carramah J Quiett
(74) *Attorney, Agent, or Firm* — Rossi, Kimms & McDowell LLP

(57) ABSTRACT

Provided is an image pickup apparatus, including: a lens portion including a focus lens unit and a magnification-varying lens unit; an image pickup element movable in an optical axis direction; a moving unit for moving the image pickup element in the optical axis direction; a memory unit for storing, as a reference position, a position of the image pickup element serving as a reference in the optical axis direction, the position corresponding to a zoom position; an operation unit for operating a defocus amount; and a controller for controlling the moving unit to move the image pickup element based on the reference position and the defocus amount operated by the operation unit.

9 Claims, 7 Drawing Sheets

(56) References Cited

U.S. PATENT DOCUMENTS

| | | | |
|---|---|---|---|
| 8,908,085 B2 | 12/2014 | Yamanaka | |
| 2007/0229978 A1* | 10/2007 | Yamazaki | G02B 15/177 359/694 |
| 2008/0130131 A1* | 6/2008 | Nishio | 359/687 |
| 2009/0040321 A1* | 2/2009 | Nakamura | H04N 5/23232 348/208.11 |
| 2010/0079604 A1* | 4/2010 | Washisu | 348/208.4 |

FOREIGN PATENT DOCUMENTS

| | | | |
|---|---|---|---|
| JP | 2001268437 A | | 9/2001 |
| JP | 2006195340 A | | 7/2006 |
| JP | 2006208703 A | | 8/2006 |
| JP | 2008129455 A | * | 6/2008 |
| JP | 2009044669 A | | 2/2009 |
| JP | 2005215520 A | | 6/2009 |
| JP | 2012022037 A | | 2/2012 |

* cited by examiner

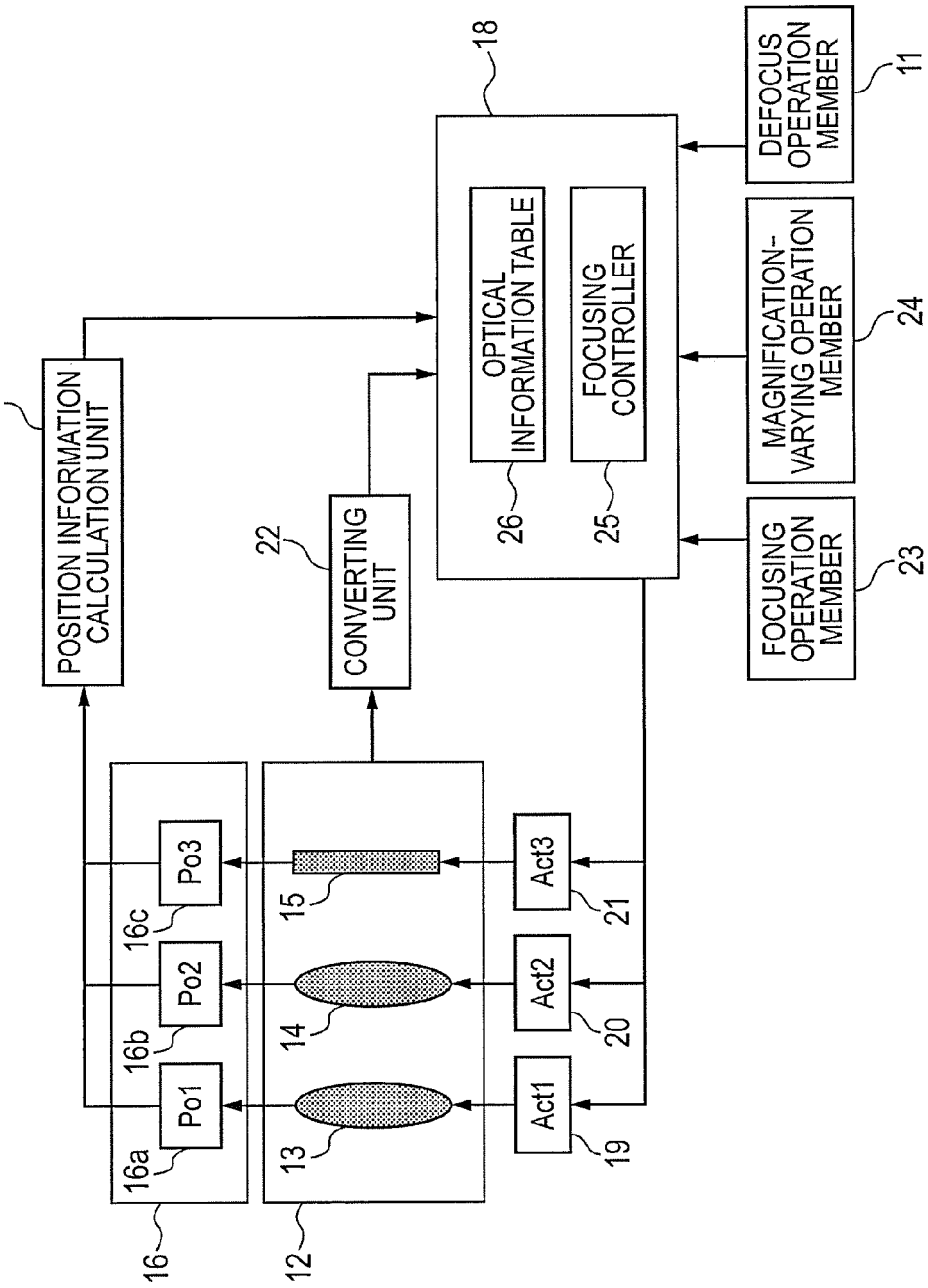

IMAGE PICKUP APPARATUS, LENS APPARATUS, AND CAMERA APPARATUS

BACKGROUND OF THE INVENTION

Field of the Invention

The present invention relates to an image pickup apparatus, and more particularly, to an image pickup apparatus including a mechanism to move an image pickup element in an optical axis direction.

Description of the Related Art

As a structure to move the image pickup element in the image pickup apparatus, there is known a structure of moving the image pickup element in a plane perpendicular to the optical axis for image stabilization or dust removal. On the other hand, there is known an optical system in which the image pickup element is moved along the optical axis in order to downsize the entire image pickup apparatus or to improve optical performance. For instance, Japanese Patent Application Laid-Open No. 2006-208703 discloses a technology to realize high-precision focus adjustment by moving a focus lens unit in the optical axis direction and afterwards moving the image pickup element in the optical axis direction to a position where a contrast evaluation value reaches a peak.

As one of methods of using the image pickup apparatus by professional users, there is a defocus photography method that does not generate a variation in angle of view by the operation of the optical system.

In this photography method, there is performed an operation of setting a large defocus state and then gradually restoring an in-focus state without changing a composition at focus and zoom positions fixed by a photographer. In particular, in order to avoid an influence of the variation in angle of view due to the operation of the focus lens unit, an optical system for close-up photography is used in many cases.

However, in the conventional technology disclosed in Japanese Patent Application Laid-Open No. 2006-208703, such a defocus operation with a small variation in angle of view can be performed in the image pickup apparatus of the rear focus type, but there is a problem that a sufficient defocus amount (a distance between an imaging position and an image pickup plane) cannot be secured due to a structural limitation, particularly in the telephoto end side of the intermediate zoom region. Therefore, photography of restoring from the large defocus state to the in-focus state can be performed in a vicinity of a wide zoom region, but a defocus state satisfying the photographer cannot be generated in the telephoto end side of the intermediate zoom region so that photography with an image effect intended by the photographer cannot be performed.

In order to solve this problem, it is necessary to physically expand a movement range of the focus lens unit so as to secure the large defocus state in the telephoto end side of the intermediate zoom region, and hence a size of the image pickup apparatus is increased.

SUMMARY OF THE INVENTION

Therefore, the present invention provides an image pickup apparatus capable of performing photography in a large defocus state over an entire zoom range without expanding a movement range of a focus lens unit in an optical axis direction, and arbitrarily adjusting a defocus amount.

According to an exemplary embodiment of the present invention, there is provided an image pickup apparatus, including: a lens portion including a focus lens unit and a magnification-varying lens unit; an image pickup element movable in an optical axis direction; a moving unit for moving the image pickup element in the optical axis direction; a memory unit for storing, as a reference position, a position of the image pickup element serving as a reference in the optical axis direction, the position corresponding to a zoom position; an operation unit for operating a defocus amount; and a controller for controlling the moving unit to move the image pickup element based on the reference position and the defocus amount operated by the operation unit.

According to the present invention, it is possible to provide the image pickup apparatus capable of performing a defocus operation based on a composition intended by a photographer, and restoring a preset composition in an in-focus state without generating the variation in angle of view when the defocus operation is finished.

Further features of the present invention will become apparent from the following description of exemplary embodiments with reference to the attached drawings.

BRIEF DESCRIPTION OF THE DRAWINGS

FIG. 3 is a block diagram illustrating a structure of the image pickup apparatus that moves an image pickup element by a defocus operation according to the first embodiment of the present invention.

DESCRIPTION OF THE EMBODIMENTS

In the following, exemplary embodiments of the present invention are described in detail with reference to the attached drawings.

Figure 1:
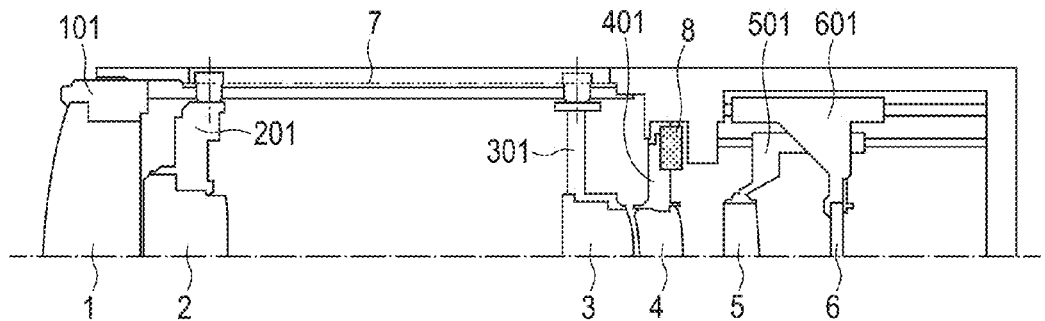
FIG. 1 is a diagram illustrating an apparatus structure of an image pickup apparatus according to a first embodiment of the present invention.
Figure 2A:
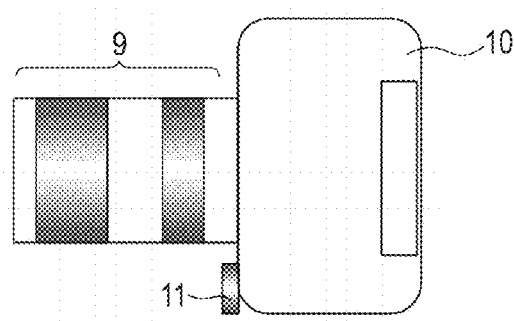
FIG. 2A is an outside view of the image pickup apparatus according to the first embodiment.
Figure 2B:
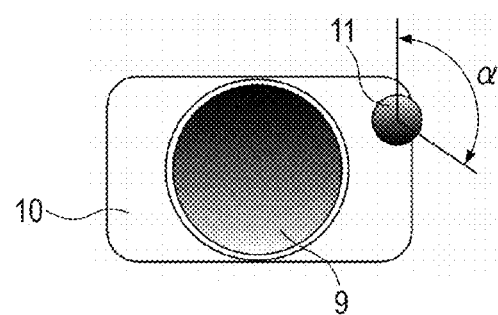
FIG. 2B is another outside view of the image pickup apparatus according to the first embodiment.
Figure 4:
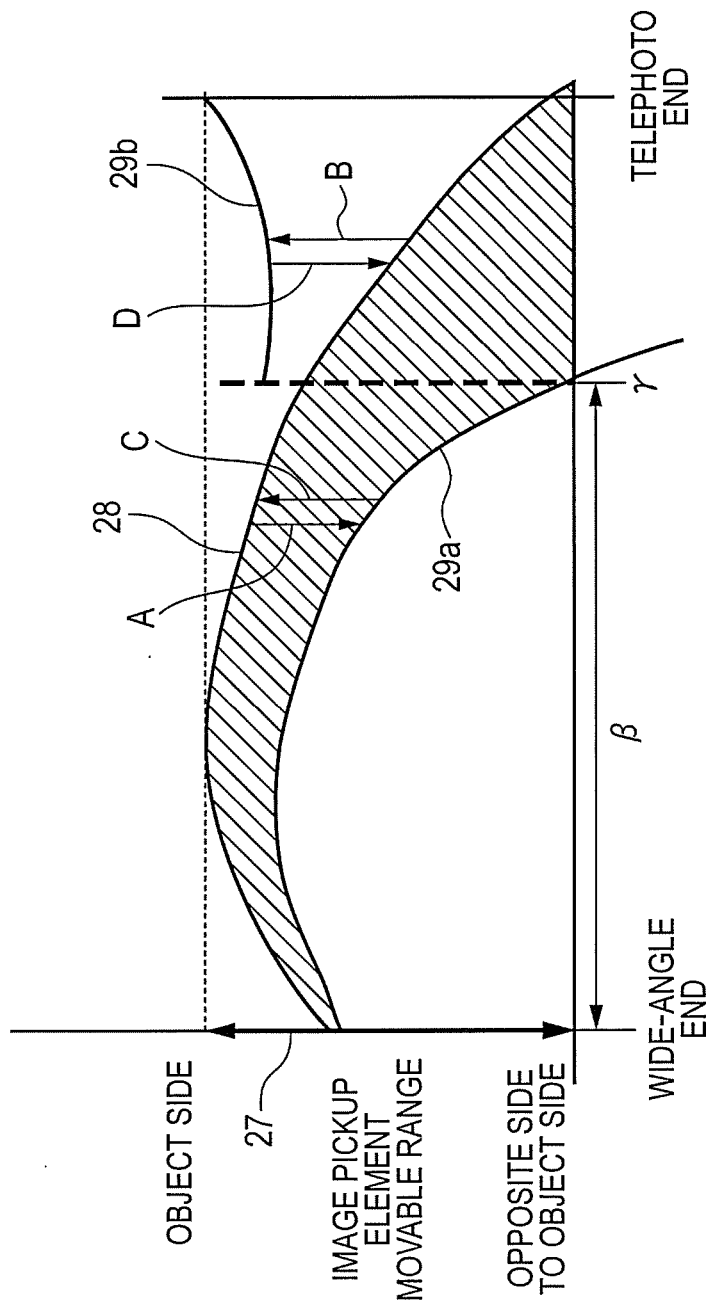
FIG. 4 is an explanatory diagram of a movement direction of the image pickup element in a zoom region according to the first embodiment.

FIG. 1 is a diagram illustrating an apparatus structure of an image pickup apparatus according to the present invention, FIGS. 2A and 2B are diagrams illustrating a structure of an exterior of the image pickup apparatus, FIG. 3 is a block diagram illustrating a control structure of the image pickup apparatus that performs a defocus operation by moving the image pickup element according to the embodiments of the present invention, and FIG. 4 is a diagram illustrating a movement control method for the image pickup element according to the embodiments of the present invention.

Figure 5:
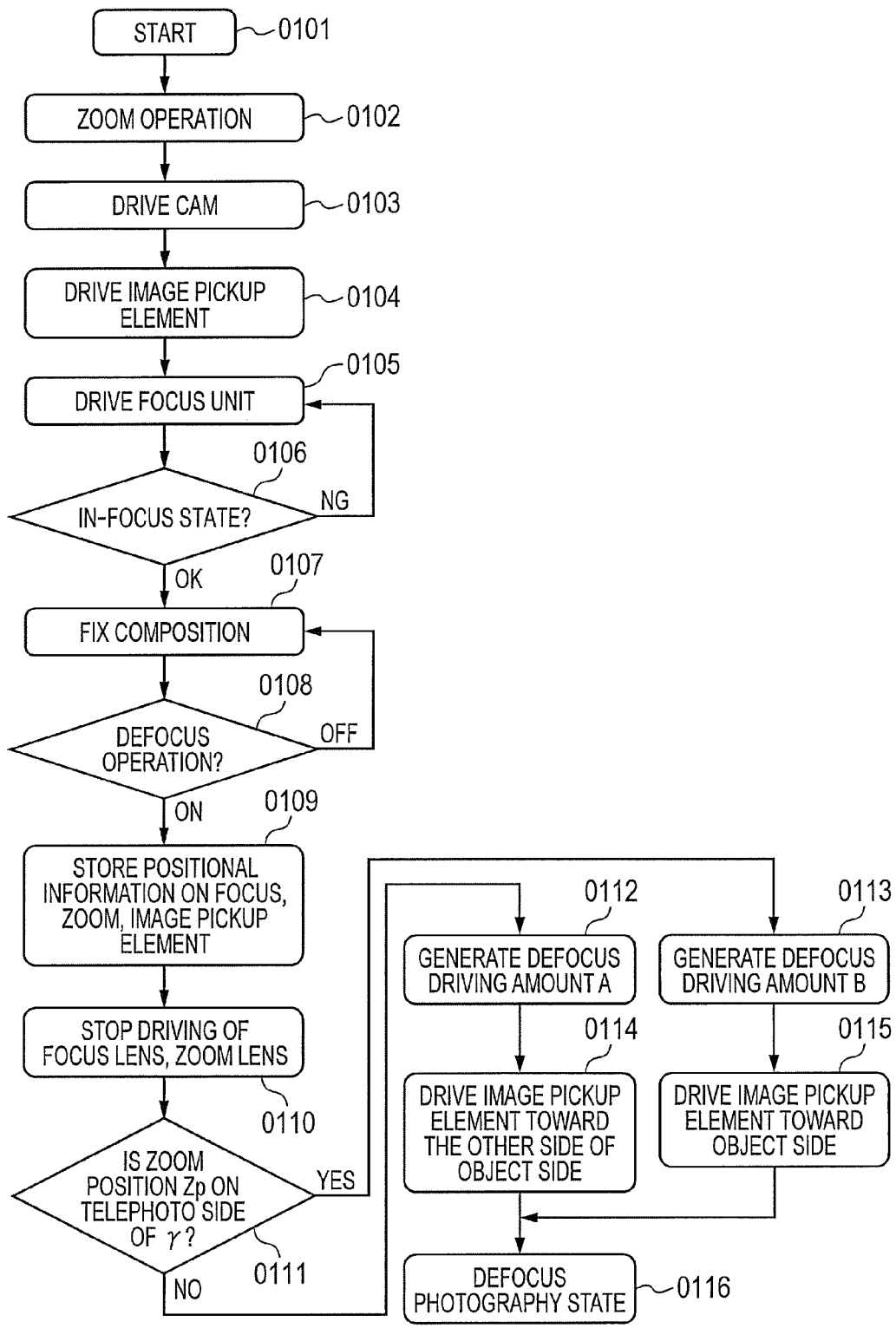
FIG. 5 is a flowchart illustrating a shift to defocus photography according to the first embodiment.
Figure 6:
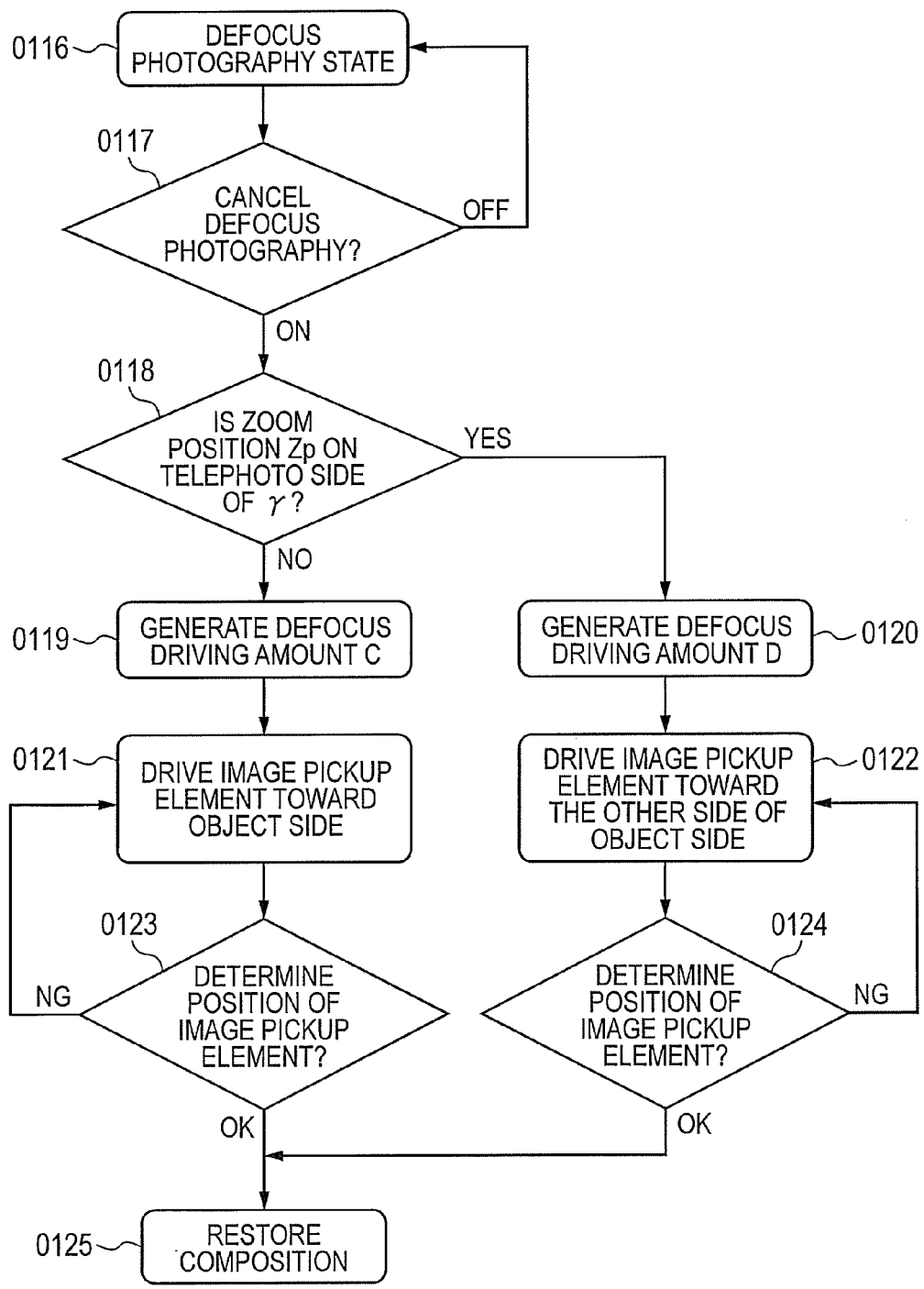
FIG. 6 is a flowchart illustrating restoration from the defocus photography to normal photography according to the first embodiment.

Further, FIG. 5 is a flowchart illustrating a shift to defocus photography by a photographer, and FIG. 6 is a flowchart illustrating a photography action for canceling the defocus photography.

(First Embodiment)

In the following, with reference to FIGS. 1 to 6, an image pickup apparatus according to a first embodiment of the present invention, which includes a mechanism for moving the image pickup element, is described.

FIG. 1 is a cross sectional view of a main part of a lens portion in the image pickup apparatus according to this embodiment. The lens portion includes a fixed lens unit 1, a magnification-varying lens unit 2 (a lens unit which moves during varying magnification), an image plane correction lens unit 3 (a lens unit which corrects focus deviation due to the movement of the magnification-varying lens unit 2), an image stabilization lens unit 4, and a focus lens unit 5. Here, the lens unit may be formed of a single lens or multiple lenses, as a matter of course.

The fixed lens unit 1 is held by a lens barrel 101, the magnification-varying lens unit 2 is fixed to a lens barrel 201, the image plane correction lens unit 3 is fixed to a lens barrel 301, the image stabilization lens unit 4 is held by a lens barrel 401, and the focus lens unit 5 is held by a lens barrel 501.

The lens barrels 201 and 301 are moved in the optical axis direction in a synchronized manner by a cam 7, the lens barrel 401 is moved in a plane perpendicular to the optical axis by a predetermined actuator 8, and the lens barrel 501 can be displaced in the optical axis direction by an actuator (not shown).

Further, an image pickup element 6 is held by a holding frame (moving unit) 601 that can move in the optical axis direction. The holding frame 601 is moved by an actuator (not shown) based on predetermined control in synchronization with the magnification-varying lens unit 2 and the image plane correction lens unit 3, which are described later in detail.

FIGS. 2A and 2B are outside views of the image pickup apparatus including the above-mentioned lens units.

A lens barrel 9 includes an operation portion for the photographer to perform a lens operation within a range in the optical axis direction from the fixed lens unit 1 to the image stabilization lens unit 4, and an image pickup apparatus main body 10 (a camera apparatus) is formed as a region corresponding to movement ranges of the focus lens unit 5 and the image pickup element 6 in the optical axis direction.

The image pickup apparatus main body 10 includes a defocus operation member (operation unit) 11 for performing a photography action of shifting only a focus position from an arbitrary composition obtained as a result of setting a focus adjustment position (focus position) and a magnification-varying adjustment position (zoom position) determined once by the photographer (hereinafter referred to as defocus photography).

As illustrated in FIG. 2B, the defocus operation member 11 can be operated within a predetermined range of an operation angle α, and as described later, the photographer can perform the defocus photography (operation of a defocus amount) corresponding to an operation angle set within the range of the operation angle α.

FIG. 3 is a block diagram illustrating a structure of this embodiment.

A block 12 illustrated in FIG. 3 represents the lens units of the lens barrels and the image pickup element in the image pickup apparatus illustrated in FIG. 1, and includes a member 13 to be moved which is linked to the cam 7 for integrally holding the magnification-varying lens unit 2 and the correction lens unit 3, a member 14 to be moved which is disposed to the lens barrel 501, and a member 15 to be moved which is disposed to the holding frame 601.

The members 13, 14, and 15 to be moved include displacement detectors 16a, 16b, and 16c (hereinafter referred to also as a displacement detector 16 collectively), respectively. An output of the displacement detector 16 is sent to a controller 18 via a positional information calculation unit 17.

The members 13, 14, and 15 to be moved are moved by actuators 19, 20, and 21, respectively. An output of the image pickup element 6 is converted by a converting unit 22 into a signal necessary for focus adjustment, and an output of the converting unit 22 is delivered to the controller 18.

In addition, this image pickup apparatus includes a focusing operation member 23 and a magnification-varying operation member 24 as well as the above-mentioned defocus operation member 11.

The focusing operation member 23 and the magnification-varying operation member 24 determine a focus operation direction (a close-up direction or an infinity direction) and a magnification-varying direction, respectively, when the photographer performs the operation. The detected signal is sent to the controller 18.

A focusing controller 25 has a function of focus adjustment by controlling movement directions and amounts of the focus lens unit 5 and the image pickup element 6 based on a predetermined optical information table 26 and the displacement detector 16, with the signals of the focusing operation member 23 and the magnification-varying operation member 24 as a trigger.

FIG. 4 illustrates a relationship between a zoom position of the magnification-varying lens unit 2 and a position of the image pickup element 6.

A movable range of the focus lens unit 5 varies along with the zoom position determined by the magnification-varying lens unit 2 and the image plane correction lens unit 3 moved in a synchronized manner by the cam 7. Similarly, a position of the image pickup element 6 in the optical axis direction also varies along with the focal length.

In FIG. 4, an arrow 27 indicates a mechanical movable range of the image pickup element 6, and a curve 28 indicates a set of positions of the image pickup element 6 serving as a reference in the optical axis direction (reference positions) varying in accordance with the zoom position. The focusing controller 25 controls the focus adjustment so that light from an object forms an image on the image pickup element 6 positioned on a locus of the curve 28. This set of positions as a reference (reference positions) corresponds to, as described later, positions of the image pickup element in the optical axis direction (or positional information corresponding to the position of the image pickup element) corresponding to the zoom position (focal length) under a state in which a certain defocus amount is obtained. The certain defocus amount is preferred to be a defocus amount in the in-focus state (a state where the defocus amount is zero). The image pickup apparatus of this embodiment may store a movement locus of the image pickup element corresponding to zoom positions (the position may continuously change corresponding to the zoom positions) or may store discrete positions of the image pickup element corresponding to the respective multiple zoom positions. In addition, the reference position may be a position (value) that does not change with respect to a change of the zoom position.

Here, largest defocus position curves (shift amounts) 29a and 29b corresponding to the above-mentioned operation angle α as the largest operation angle of the defocus operation member 11 disposed on the image pickup apparatus main body 10, are calculated as position curves with respect to the zoom positions, which are corrected from the control circuit 25 and the optical information table 26 with reference to the position curve 28 as reference positions.

When performing the defocus photography in a zoom region β (region from the wide-angle end to an intermediate zoom position denoted by γ in the diagram), in order to obtain a larger defocus amount, the image pickup element 6 is moved in the direction opposite to the object side (hereinafter referred to as the other side of the object side) from the position curve 28 as reference positions. The largest defocus position curve 29a is a curve indicating positions of the image pickup element 6 on the side closest to the reference position (position curve 28) in which a largest defocus amount can be obtained in the region β. A position of the image pickup element 6 corresponding to the largest operation angle α of the defocus operation member 11 is set to correspond to the largest defocus position curve 29a. In other words, the largest operation angle α of the defocus operation member 11 is set to correspond to the position of the image pickup element 6 on the side closest to the reference position (position curve 28) in which a largest defocus amount can be obtained.

In order to obtain a defocus amount equal to the largest defocus amount (a defocus amount corresponding to the largest operation angle α of the defocus operation member 11), which is obtained by moving the image pickup element 6 to the other side of the object side in the region β, by moving the image pickup element 6 to the other side of the object side in a zoom position on the telephoto end side of the region β (zoom position γ), it is necessary to move the image pickup element 6 to a position beyond the movable range of the image pickup element 6.

This event is the same in a case where the focus lens unit 5 is moved so that a predetermined amount of the effect of the defocus photography is achieved. In other words, in order to obtain a largest defocus effect (largest defocus amount) on the telephoto end side of the region β (zoom position γ), it is necessary to move the focus lens unit 5 to a position beyond the movable range of the focus lens unit 5. Therefore, in order to perform the defocus photography for a largest defocus effect on the telephoto end side of the region β, it is effective to move the image pickup element 6 from the reference position as described in detail below.

When the image pickup apparatus is used on the telephoto end side of the region β, the image pickup element 6 is moved to the object side from the reference position curve 28 so as to perform the defocus photography. Therefore, the control circuit 25 calculates the largest defocus position curve 29b as the position curve corrected from the reference position curve 28 stored in the optical information table 26 (corresponding to the largest operation angle α of the defocus operation member 11).

The above-mentioned largest defocus position curves 29a and 29b indicate positions to which the image pickup element 6 is moved when the defocus operation member 11 is operated to the operation angle α as the largest operation angle thereof. With respect to an arbitrary operation angle, the image pickup element 6 is controlled to move between the position curve 28 and the largest defocus position curves 29a and 29b, for example, to a position corresponding to a ratio between the arbitrary operation angle and the largest operation angle α.

FIG. 5 is an explanatory flowchart in a case where the defocus movement amounts 29a and 29b are generated corresponding to the operation angle of the defocus operation member 11 described above with reference to FIG. 2B so that the image pickup element 6 is moved.

When the photographer starts photography (0101) and performs the zoom operation with the magnification-varying operation member 24 (0102), the cam 7 moves (0103). Then, the image pickup element 6 is moved in synchronization with movements of the magnification-varying lens unit 2 and the image plane correction lens unit 3 (0104).

The focus lens unit 5 is moved by the focusing controller 25 until the in-focus state is obtained (0105 and 0106), and hence a composition intended by the photographer is achieved (0107).

In order to perform the defocus photography with respect to the composition that has been fixed once, the photographer operates a knob of the defocus operation member 11 by an arbitrary operation angle within a predetermined operation angle (0108). Then, the focusing controller 25 stores positional information on the focus, the zoom, and the image pickup element for restoring, after the defocus photography, the composition state before the defocus photography (0109).

Next, movements of the focus lens unit and the magnification-varying lens unit are stopped and positions thereof are fixed so that a variation in angle of view is not generated (0110).

In order to determine the direction of movement of the image pickup element 6 for the defocus photography, the zoom position is determined with respect to the zoom position γ as a boundary, which is described above in detail with reference to FIG. 4 (0111). In other words, it is determined whether the zoom position is inside or outside the region β illustrated in FIG. 4.

If a zoom position Zp when the defocus photography is started is on the wide-angle end side of the position γ or matches with the position γ (inside the region β), a movement amount A is calculated, which is a shift amount for moving the image pickup element 6 to the other side of the object side in accordance with the operation angle of the defocus operation member 11 (0112), and hence the image pickup element 6 is moved (0114).

In addition, if the zoom position when the defocus photography is started is on the telephoto end side of the position γ (outside the region β), a movement amount B is calculated, which is a shift amount for moving the image pickup element 6 to the object side in accordance with the operation angle of the defocus operation member 11 (0113), and hence the image pickup element 6 is moved (0115).

As described above, the defocus photography state is achieved by movement of the image pickup element 6 in accordance with the operation of the defocus operation member 11 (0116).

FIG. 6 is an explanatory flowchart illustrating an operation of canceling the defocus photography and restoring the composition state in which the defocus photography is started.

The flow for canceling the defocus photography is started by the photographer's operation of the defocus operation member 11 to reverse the operation direction thereof when performing an operation of restoration to the fixed composition from the defocus photography state (0117).

When the defocus canceling operation is started, the determination result of the stored zoom position when the composition is fixed (wide-angle end side or telephoto end side of the position γ) is determined (0118), and the movement direction of the image pickup element 6 in the optical axis direction is determined in accordance with the determination result.

If the zoom position Zp is on the wide-angle end side of the position γ or matches with the position γ (inside the region β), by the same calculation method as that for the above-mentioned movement amount A, a movement amount C is calculated, in which the movement direction of the image pickup element 6 at that time becomes the direction opposite to the direction of the movement when the defocus photography is performed (0119), and hence the image pickup element 6 is moved (0121).

On the other hand, if the zoom position Zp is on the telephoto end side of the position γ (outside the region β), a movement amount D having the same value as the above-mentioned movement amount B is calculated, in which the movement direction of the image pickup element 6 at that time becomes the direction opposite to the direction of the movement when the defocus photography is performed (0120), and hence the image pickup element 6 is moved (0122).

In this flow, the position of the image pickup element 6 when the composition is fixed is set to a target value, and a position with respect to the position target value when the defocus photography of the image pickup element 6 is canceled is determined (0123 and 0124). If the position reaches the target value, the composition before setting the defocus photography is restored (0125).

The defocus operation member 11 includes a mechanism for conveying a click sense or the like to the photographer through touch feeling (operation feeling) of the defocus operation member 11 so that the photographer can sense a start position (an operation position corresponding to a defocus amount of zero) during the operation of the defocus operation member 11. With this structure, it is possible to securely perform the canceling operation of the defocus operation member 11 to the position where the composition before setting the defocus photography has been fixed.

In this embodiment, as to the defocus photography canceling operation of the defocus operation member 11, it is possible to adopt a method of calculating a target position in proportion to a return amount of the operation angle of the operation member, or a method of setting the position when the composition is fixed as the target position with the reverse rotation operation of the defocus operation member 11 as a trigger.

As described above, as a trigger for performing predetermined movement control for the image pickup element to perform defocus photography, the defocus operation member is disposed independently of the focusing operation member. Therefore, it is possible to perform the photography in which the defocus photography is performed from a start point of the composition fixed once by the photographer, and further restoration to the composition at the start point can be easily performed.

According to the above-mentioned embodiment, there is obtained an effect that the photographer can arbitrarily shift the in-focus state to the defocus photography in a reversible manner in the composition fixed in the photography action.

(Second Embodiment)

In the following, with reference to the flowcharts of FIGS. 7 and 8, an image pickup apparatus according to a second embodiment of the present invention, which includes a mechanism for moving the image pickup element, is described. The same components as those in the first embodiment are denoted by the same reference symbols.

Also during a period in which the photographer is performing the defocus photography, the photographer may put a priority on photography of another object. In this case, the photographer intentionally performs an operation of changing the composition.

In this case, the photographer performs the focus adjustment operation by using the focusing operation member 23 on the image pickup apparatus or the zoom operation by using the magnification-varying operation member 24 so as to change the composition. Therefore, it is effective to use the operation of the focusing operation member 23 or the magnification-varying operation member 24 as a trigger to start changing the composition.

Figure 7:
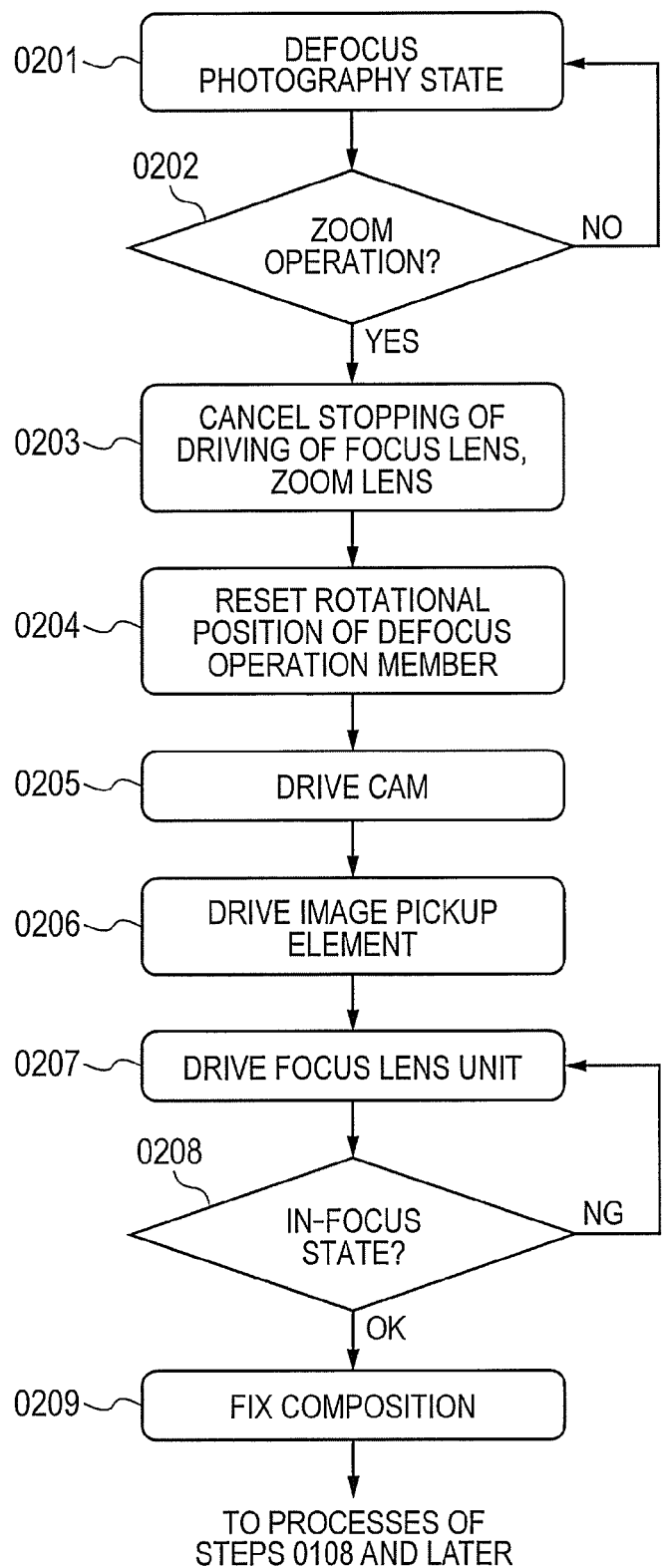
FIG. 7 is a flowchart in a case where a zoom operation is performed during defocus photography according to a second embodiment of the present invention.
Figure 8:
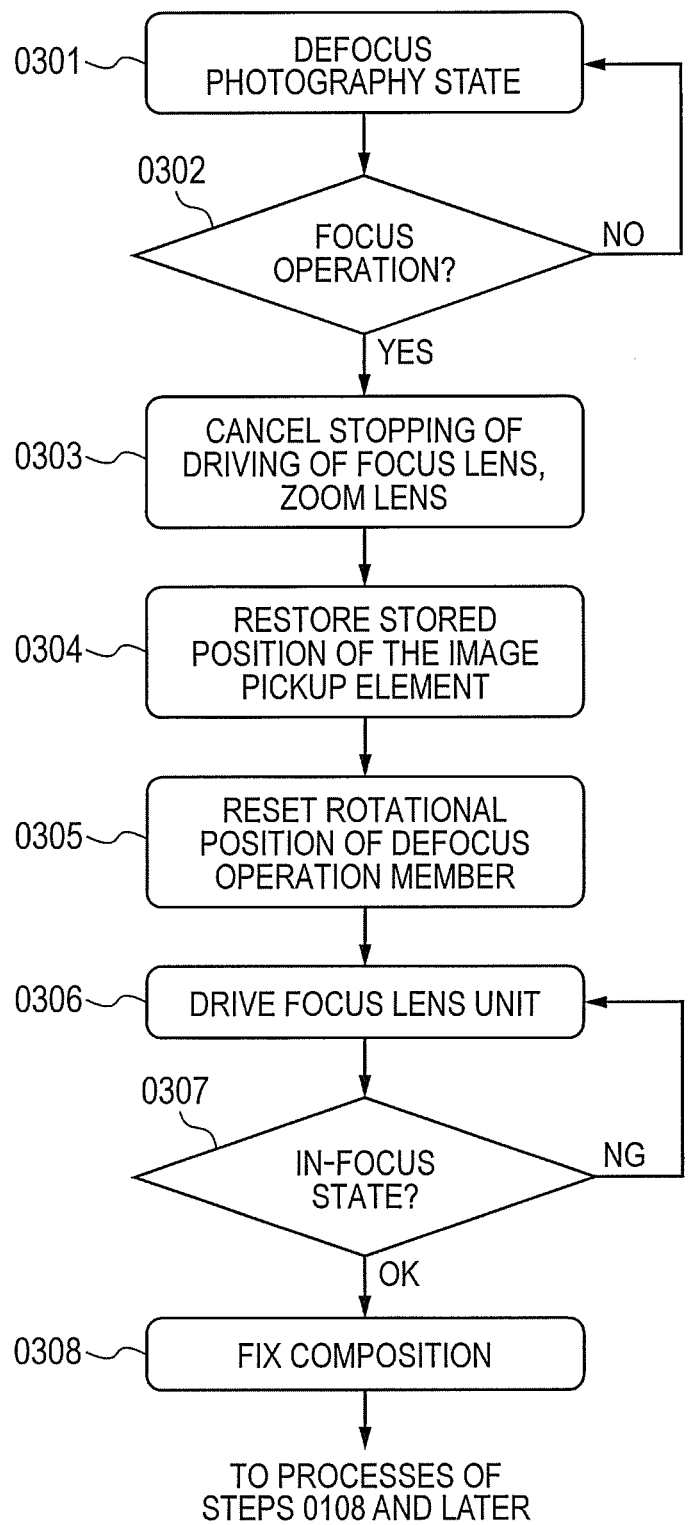
FIG. 8 is a flowchart in a case where a focus operation is performed during the defocus photography according to the second embodiment.

As described above in detail in the first embodiment, the state where the photographer is performing the defocus photography by the operation of the defocus operation member 11 is regarded as a start point of the flow (0201) as illustrated in FIG. 7 for description.

When the photographer operates the magnification-varying operation member 24 for changing the composition (0202), movement stop of the focus lens unit 5, the magnification-varying lens unit 2, and the image plane correction lens unit 3 in the composition fixed by the photographer before the defocus photography is canceled (0203).

Next, in order to enable restart of the defocus photography, a relative rotational position of the defocus operation member is reset (0204).

Then, the cam 7 is moved in accordance with the operation of the magnification-varying operation member 24, and the image pickup element 6 is moved along the reference position curve 28 in synchronization with the movement of the cam 7. Further, focusing control of the focus lens unit 5 is performed so that a new composition is fixed (0205 to 0209).

After the composition is fixed, it is possible to perform the defocus photography as described above in detail in the first embodiment (0108 to 0116).

A case where the photographer operates the focusing operation member 23 to change the composition is described with reference to FIG. 8.

When the focusing operation member 23 is operated (0302), cease of movement of the focus lens unit 5, the magnification-varying lens unit 2, and the image plane correction lens unit 3 in the composition fixed by the photographer before the defocus photography is canceled (0303).

Further, a position of synchronization (reference position) of the image pickup element 6 corresponding to the positional information of the magnification-varying lens unit 2 and the image plane correction lens unit 3 is restored (0304). Here, zoom operation is not performed, and hence a movement amount as a shift amount when shifting to the defocus photography is switched in the direction opposite to that when shifting to the defocus photography so that the reference position is restored.

The relative rotational position of the defocus operation member is reset (0305), determination of the in-focus state is restarted from the flow of determining the in-focus state, which is described above in detail in the first embodiment, and the composition is fixed (0306 to 0308). Thus, the photographer can restart the defocus photography (0108 to 0116).

As described above, the change in composition performed by the photographer is recognized by treating the operation of the magnification-varying operation member or the focusing operation member as its trigger, and hence it is possible to promptly perform, also during the defocus photography, photography in accordance with the composition change intended by the photographer. In other words, the controller 18 performs control to stop movements of the focus lens unit 5 and the magnification-varying lens unit during a period from the start of the operation of the defocus operation member 11 until restoration of the position of the image pickup element 15 to the reference position corresponding to the zoom position (during defocus photography). In addition, if the zoom operation or the focus operation is performed during the defocus photography, the controller 18 forcibly stops the defocus photography so that photographer's intention of changing the composition about zooming, focusing or the like can be promptly reflected on the photography. When the defocus photography is forcibly stopped, it is possible to perform new defocus photography after the composition is fixed again.

According to the above-mentioned embodiment, there is obtained an effect that the photographer can continue the photography with the changed composition without delay also when he or she changes the composition in progress, which is fixed in the photography action.

Further, an effect can be obtained that, after the composition is fixed again, the photography can be restarted by arbitrarily shifting the in-focus state to the defocus photography in a reversible manner.

The lens apparatus of the present invention can be removably mounted to a camera apparatus including an operation unit for operating the defocus amount. The lens apparatus includes a lens portion including a focus lens unit and a magnification-varying lens unit, an image pickup element movable in the optical axis direction, a moving unit for moving the image pickup element in the optical axis direction, a memory unit for storing, as a reference position, a position of the image pickup element serving as a reference in the optical axis direction, the position corresponding to a zoom position, and a controller for controlling the moving unit to move the image pickup element based on the reference position and a defocus amount operated by the operation unit. In the lens apparatus having this structure, it is possible to obtain the above-mentioned actions and effects of the present invention.

The camera apparatus of the present invention includes the lens apparatus including the focus lens unit and the magnification-varying lens unit, the lens apparatus being removably mounted to the camera apparatus, the image pickup element movable in the optical axis direction, the moving unit for moving the image pickup element in the optical axis direction, the memory unit for storing, as the reference position, a position of the image pickup element serving as a reference in the optical axis direction, the position corresponding to the zoom position, the operation unit for operating the defocus amount, and the controller for controlling the moving unit to move the image pickup element based on the reference position and the defocus amount operated by the operation unit. Further, in the camera apparatus having this structure, it is possible to obtain the above-mentioned actions and effects of the present invention.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-025040, filed Feb. 8, 2012, which is hereby incorporated by reference herein in its entirety.

What is claimed is:

1. An image pickup apparatus comprising:
an operation member that operates and outputs a defocus amount for performing a defocus photography;
a lens portion including a magnification-varying lens unit that moves in an optical axis direction during zooming;
an image pickup element configured to move during zooming in the optical axis direction along a predetermined moving locus, in a case where the defocus amount output from the operation member is zero; and
a controller configured to control movement of the image pickup element in the optical axis direction and having a memory that stores the predetermined moving locus,
wherein the controller is configured to control the movement of the image pickup element to:
one side in the optical axis direction with respect to the predetermined moving locus in a case where the zoom position is set within a range of a predetermined zoom position from a wide angle end and the defocus amount output from the operation member is not zero; and
the other side in the optical axis direction with respect to the predetermined moving locus in a case where the zoom position is set on a telephoto end side of the predetermined zoom position and the defocus amount output from the operation member is not zero.

2. The image pickup apparatus according to claim 1, wherein:
the controller calculates a shift amount of the image pickup element with respect to the predetermined moving locus based on the defocus amount output from the operation member, and
the controller controls the movement of the image pickup element based on the predetermined moving locus and the shift amount.

3. The image pickup apparatus according to claim 1, wherein the operation member comprises a mechanism that conveys an operation feeling to a photographer to notify the photographer of an operation position of the operation member corresponding to a defocus amount of zero during an operation of the operation member by the photographer.

4. The image pickup apparatus according to claim 2, wherein the shift amount comprises:
a shift amount for moving the image pickup element to a side opposite to an object side in the optical axis direction with respect to the predetermined moving locus in a case where the zoom position is set within the range of the predetermined zoom position from a wide-angle end; and
a shift amount for moving the image pickup element to the object side in the optical axis direction with respect to the predetermined moving locus in a case where the zoom position is set on the telephoto end side of the predetermined zoom position.

5. The image pickup apparatus according to claim 1, wherein:
the lens portion includes a focus lens unit,
the controller performs control to stop movements of the focus lens unit and the magnification-varying lens unit during a period from start of an operation of the operation member until restoration of a position of the image pickup element to a position on the predetermined moving locus stored in the memory, and
the reference position depends on the zoom position.

6. The image pickup apparatus according to claim 1, wherein, in a case where at least one of a focus adjustment operation or a zoom operation is performed, the controller resets a position of the image pickup element to a position on the predetermined moving locus.

7. The image pickup apparatus according to claim 1, wherein:
the predetermined moving locus comprises a position of the image pickup element in an in-focus state in the optical axis direction, and
the position depends on the zoom position.

8. The image pickup apparatus according to claim 7, wherein the position continuously varies depending on the zoom position.

9. A camera apparatus comprising:
an operation member that operates and outputs a defocus amount for performing a defocus photography;
a removable lens apparatus including a magnification-varying lens unit that moves in an optical axis direction during zooming;
an image pickup element configured to move during zooming in the optical axis direction along a predetermined moving locus, in a case where the defocus amount output from the operation member is zero; and
a controller configured to control movement of the image pickup element in the optical axis direction and having a memory that stores the predetermined moving locus,
wherein the controller is configured to control the movement of the image pickup element to:
one side in the optical axis direction with respect to the predetermined moving locus in a case where the zoom position is set within a range of a predetermined zoom position from a wide angle end and the defocus amount output from the operation unit is not zero; and
the other side in the optical axis direction with respect to the predetermined moving locus in a case where the zoom position is set on a telephoto end side of the predetermined zoom position and the defocus amount output from the operation member is not zero.

* * * * *